102290 V. L. Maxwell

Faucet Lock

PATENTED APR 26 1870

Witnesses –
F. W. Howard
F. Petersen

V. L. Maxwell
Inventor
By David A. Burr atty.

United States Patent Office.

V. L. MAXWELL, OF WILKESBARRE, PENNSYLVANIA.

*Letters Patent No. 102,290, dated April 26, 1870; antedated April 18, 1870.*

IMPROVEMENT IN FAUCET-LOCKS.

The Schedule referred to in these Letters Patent and making part of the same.

*To all whom it may concern:*

Be it known that I, V. L. MAXWELL, of Wilkesbarre, in the county of Luzerne and State of Pennsylvania, have invented a new and useful Faucet-Lock; and I do hereby declare the following to be a full and exact description thereof, reference being had to the accompanying drawings forming a part of this specification, in which—

The nature of my invention consists in inserting a loose bolt within and withdrawing it from a suitable aperture in a faucet or valve-cock, by means of a suitable key, which may be easily attached to, or detached from, the bolt; the aperture being so pierced in the faucet or cock as that the bolt, when inserted therein, will engage with the spigot, or the valve, and lock the same, preventing any further movement thereof until the bolt be withdrawn.

The bolt, when inserted, is wholly inclosed within the faucet or cock, and cannot be removed without the use of a key properly and accurately fitting the same.

My invention may be applied to any description of wooden or metallic faucets, and to any variety of valve-cocks.

In the accompanying drawings—

A represents an ordinary cheap wooden faucet, and B, the spigot thereof, $a$ being a cork lining to the spigot-hole. In applying my invention to this, or indeed to any form of faucets, of whatever material, no change in their construction is required. My improvement is applicable to the stock already manufactured.

Figure 1:
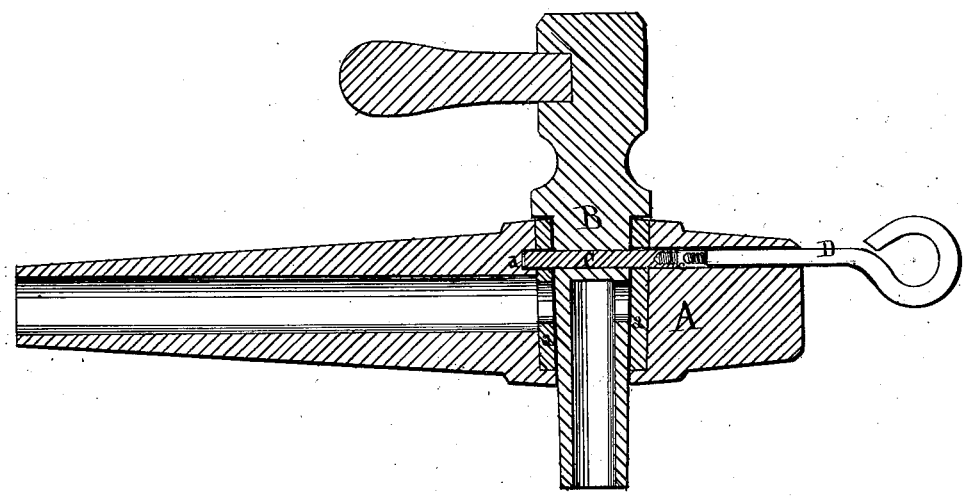
Figure 1 is a central longitudinal section through a faucet, illustrating my improved lock for the same, and the application of a key to the bolt for its withdrawal.

It is effected by drilling a small hole, $c\,d$, thereinto, either longitudinally from its front end, as illustrated in fig. 1, or else transversely from the side, or otherwise from any desired external point, so that it shall extend continuously into or through the spigot when the spigot is in the position in which it may be desired to fasten and secure the same.

(In the drawing, fig. 1, the aperture is shown as pierced to admit of locking the faucet when it is closed or wide open.)

To lock the faucet, I insert into the aperture $c\,d$ a bolt, C, which will pass freely, yet snugly and closely into the aperture, and push it back therein far enough so that its inner end shall either pass entirely through the spigot, as shown in fig. 1, or at least engage therewith, to prevent a movement thereof.

This bolt C is made of such a length relative to the depth of the aperture in the faucet, as that, when inserted far enough to lock the same, its outer end shall be so far within the aperture, and so inclosed thereby, as that it cannot be reached but by an instrument.

To effect the removal of the bolt at pleasure I combine therewith a suitable key, D.

The manner of combining the bolt and key admits of very great variety in form and contrivance. It is simply required that there shall be a device whereby the key may be made to take hold of the end of the bolt to withdraw it after its insertion. I have illustrated, in figs. 1 and 2, such a device in the form of a screw-connection between the bolt and key. In fig. 1 the end of the key is threaded, and passes into a threaded aperture in the end of the bolt. In this case no change in the diameter of the aperture $c\,d$ receiving the bolt and key is required.

Figure 2:
Figures 2 and 3 illustrate simple modifications of the connection of the key to the bolt.
Figure 3:

In fig. 2 the end of the bolt is threaded, and the end of the key is provided with a threaded aperture to screw onto it, but in this case the aperture $c$ must be enlarged so far as the key is required to extend. Fig. 3 illustrates a simple form of spring catch.

When the key and bolt are withdrawn from the faucet, the catch is disengaged from the bolt by means of a pin, E, inserted through the hole $e$ to force it down. Other forms of equivalent self-connecting or easily attachable and detachable key-devices will readily suggest themselves to any skilled mechanic, and I need not here enumerate them.

In applying my invention to valve-cocks the aperture for the lock-bolt C is so pierced as to pass into or through the valve-stem, or into, or close to, the valve itself, in such manner as that the insertion of the bolt shall prevent a further movement of the valve.

The bolt C may itself be solid or hollow. The apertures $c\,d$ to receive the bolt may be cylindrical, as illustrated, or of an angular or flattened form, the bolt and key being necessarily counterparts thereof, or at least approximately so.

It is evident that with the same key-aperture $c$ in the faucet, two or more bolt-apertures $d$ may be pierced in the spigot, so that the spigot may, if desired, be locked when either partially or entirely opened or closed.

I contemplate so combining the bolt with the faucet as that, after its withdrawal from the spigot or valve, its entire removal from the faucet shall be prevented by a catch, or other suitable device, to avoid thereby all danger of a loss of the bolt.

I contemplate also so constructing the faucet and spigot, as that the spigot, after receiving the bolt, may partially revolve, carrying the bolt with it, its end or ends passing into slots cut for the purpose in the perimeter of the spigot-hole, whereby the lock-bolt may be still further protected from picking or undue removal.

My improved lock is applicable to the cheapest as well as the most complicated and expensive faucets and cocks. It is very cheaply produced, and cheaply applied to any faucet or cock in use. Its advantages are so palpable as not to need recital.

Having thus fully described my invention,

I claim therein as new and desire to secure by Letters Patent—

Devices substantially as herein described for locking a cock or faucet, viz, a bolt C, one or more transverse apertures pierced in the cock or faucet and continued into its spigot, valve, or valve-stem to receive the bolt, and a key D, so fitting the bolt as that it may be readily attached thereto or detached therefrom after its insertion into the cock or faucet, when said devices are combined and made to operate substantially as herein set forth.

The foregoing specification of my improved lock for faucets signed by me this 3d day of July, 1869.

V. L. MAXWELL.

Witnesses:
 G. P. STEELE,
 JOHN STEELE.